H. FERRIS.
Hedge-Plant Grab.

No 53,963.

Patented Apr. 17, 1866.

Witnesses.
P. T. Dodge.
N. Sheaher.

Inventor.
H. Ferris
By his Atty.
W. C. Dodge.

UNITED STATES PATENT OFFICE.

HENRY FERRIS, OF GALESBURG, ILLINOIS.

IMPROVEMENT IN HEDGE-PLANT GRABS.

Specification forming part of Letters Patent No. 53,963, dated April 17, 1866.

*To all whom it may concern:*

Be it known that I, H. FERRIS, of Galesburg, in the county of Knox and State of Illinois, have invented certain new and useful Improvements in Implements termed "Grabs;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1:
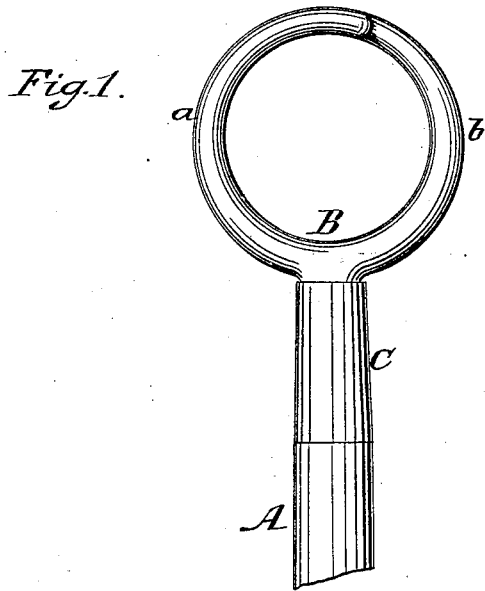
Figure 3:
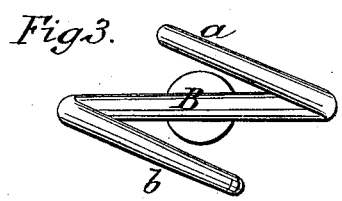
Figure 2:
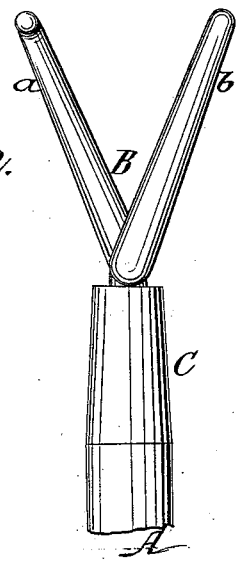

Figure 1 is a side view, Fig. 2 is an edge view, and Fig. 3 is an end view, of my improved implement.

My invention consists in a hook having two curved prongs spread apart at the top, so that they may be made to clasp and hold the limbs of hedge-plants, fruit-trees, and similar articles, it being provided with a handle, so that the articles may be reached at a distance.

B represents a hook, composed of two curved prongs, *a* and *b*, each of which is bent in the form of a half-circle, as shown in Fig. 1, their points extending a little beyond the center, so that when viewed from the side they will lap by each other, as shown in Figs. 1 and 3. These prongs *a* and *b* are each curved in opposite directions sidewise, so that at their points they are spread apart, as shown in Figs. 2 and 3, by which an open space is left between them, as shown.

The hook B thus constructed is inserted in the end of a handle, A, provided with a ferrule, C, this handle being of any required length, according to the work for which the instrument is intended to be used.

This instrument is more especially intended for seizing and handling the limbs of hedge-plants which are armed with thorns and cannot, therefore, be handled by the hand. It can also be used for holding and bending down the limbs of fruit-trees or for shaking off apples, nuts, &c., for shaking a swarm of bees off a limb on which they may alight when swarming or pulling down the limb with the bees on it, for drawing up articles out of the water, and many similar purposes. In hedges it is often necessary to bend and push the limbs into the open spaces to fill gaps, &c., and for this it is specially useful.

To use it, it is only necessary to push the prongs up on each side of the limb and then turn the implement so as to hook over the limb and hold it.

Having thus described my invention, what I claim is—

The grab or implement constructed and operating as and for the purposes herein set forth.

HENRY FERRIS.

Witnesses:
 B. F. ARNOLD,
 W. A. WOOD.